Feb. 28, 1939. H. BUSS 2,149,113
VEHICLE WHEEL STRUCTURE
Filed Dec. 30, 1936
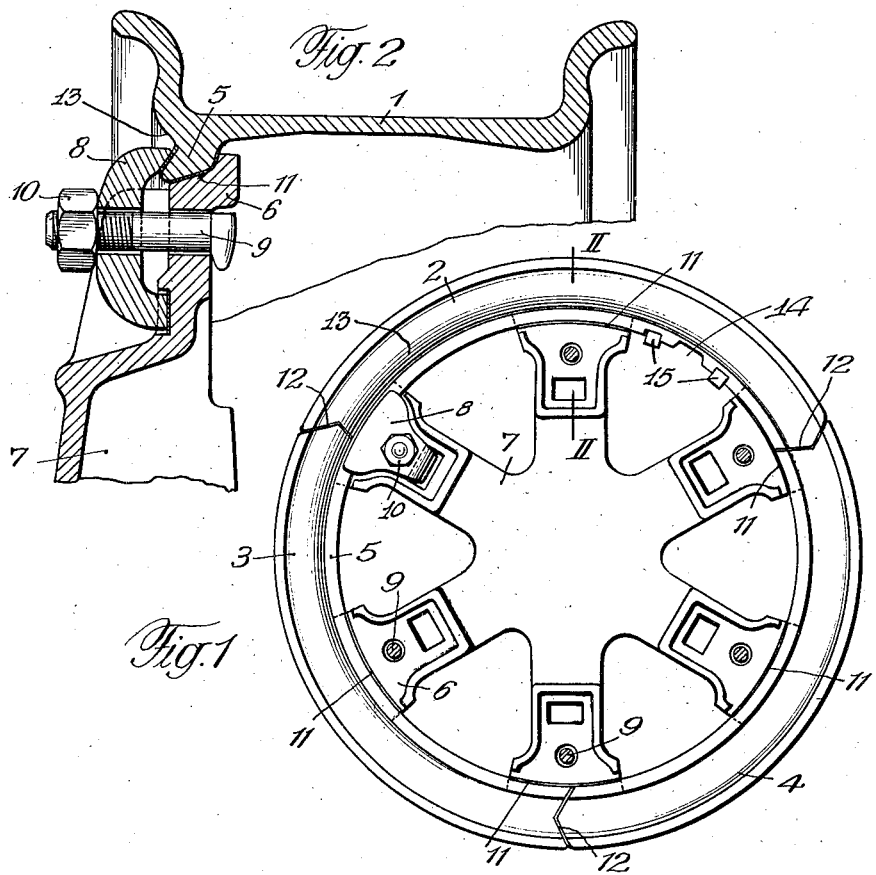
Inventor:
Hans Buss
By Sommers & Young
Attys Patented Feb. 28, 1939

2,149,113

UNITED STATES PATENT OFFICE 2,149,113

VEHICLE WHEEL STRUCTURE

Hans Buss, Schaffhouse, Switzerland, assignor to the firm Aktiengesellschaft der Eisen- und Stahlwerke vormals Georg Fischer, Schaffhouse, Switzerland Application December 30, 1936, Serial No. 118,354
In Switzerland January 4, 1936

4 Claims. (Cl. 301—12)

This invention relates to vehicle wheel structures comprising a wheel body constructed as a wheel spider and at least one demountable wheel rim.

The essence of the invention consists in that either one or both of said two different wheel elements, as the wheel spider and the wheel rim or rims, is made of a light weight metal or a light weight metal alloy and provided at the bearing surface portions for joining with the other part with a metal spray coat of a harder metal or alloy, for the purpose of increasing the allowable specific bearing pressure. As a metal or an alloy for the metal spray coat, for example, carbon steel, a steel alloy or an aluminium alloy containing about 12 to 30% of silicium may be used, it being however understood that the invention is not limited to the samples of metals and alloys specified.

In the accompanying drawing a form of the invention is illustrated by way of example only, in which Fig. 1 shows an end elevation of a wheel body constructed as a wheel spider and carrying a demountable rim, the clamping plates securing the demountable rim to the wheel body being omitted for the sake of clarity.

Fig. 2 shows a larger scale radial section of the rim and the corresponding head of the wheel body on the line II—II in Fig. 1.

In the drawing numeral 1 designates the demountable rim made of light metal, which in the present instance is provided with an undivided cross section as shown. The rim 1 is composed of three segmental portions referred to as 2, 3 and 4. Laterally of the rim centre, on the inner circumference of the rim bottom, an annular projection 5 is provided which seats on the spoke heads 6 of the wheel body 7. The wheel body 7 may, for example, consist of cast steel or else of a tempered casting. Clamping plates 8 bear against the outer side face of the annular projection 5 forming one of the surfaces of a V-shaped recess 13 on the outside of the rim 1, the plates being held in position by headed bolts 9 anchored to the spoke heads 6 and provided with nuts 10.

The annular projection 5 of the light weight metal rim 1 is provided at the surface portions which bear on the spoke heads 6 with a spray coat 11 of a hard metal. The spray coat may consist, for example, of carbon steel or of a steel alloy. However, the spray coat is by no means limited to steel as constituent material in that any other metal or alloy of sufficient hardness may be used instead. The application of the spray metal coat serves the purpose of increasing the allowable specific bearing pressure between the mating surfaces on the spoke heads 6 and the light metal rim 1.

The butt joint surfaces on the segmental portions 2, 3 and 4 of the light metal rim 1 are also provided with hard metal spray coats 12 with a view to increasing the allowable specific bearing pressure, at the butt joints of the rim segments. The invention is, however, in no ways limited to wheel rims that are composed of a number of segments, it being understood that the invention is likewise applicable to all known or feasible rim constructions, for example, also those providing for closed annular rims or annular split rims.

As structural material for the wheel body 7 light weight metal may be used instead of cast steel or a tempered casting. In such case the surface portions on the spoke heads 11 bearing on the rim 1 may also be provided with a spray coat 12 of a hard metal. There are also forms of the invention feasible in which the wheel spider consists of light metal, whereas the rim is made of steel. The rim segment 2 is shown in Fig. 1 to be provided with an incision 14 for receiving the air valve and with stops 15 for preventing the rim from creeping circumferentially, all of which is known per se.

I do not limit myself to the particular size, shape, number or arrangement of parts as shown and described, all of which may be varied without going beyond the scope of my invention as shown, described and claimed.

What I claim is:

1. In a vehicle wheel structure, a wheel body element constructed as a spider, a demountable wheel rim element, one of said elements containing light metal, surface portions on said two wheel elements bearing on one another at circumferentially spaced points in the assembled condition of the wheel structure, and spray coatings of a harder metal applied to said surface portions of said elements containing said light metal.

2. In a vehicle wheel structure, a wheel body element constructed as a spider, a demountable wheel rim element made of light metal, surface portions on said wheel elements bearing on one another at circumferentially spaced points in the assembled condition of the wheel structure, and spray coatings of a harder metal than said light metal applied to said surface portions of said wheel rim.

3. In a vehicle wheel structure, a wheel body element constructed as a spider and made of a light metal alloy, a demountable wheel rim element, surface portions on said wheel elements bearing on one another at circumferentially spaced points in the assembled condition of the wheel structure, and spray coatings of a harder metal than said metal alloy applied to said surface portions of said wheel body.

4. In a vehicle wheel structure, a wheel body element constructed as a spider, a demountable wheel rim element composed of a plurality of segmental portions and made of light metal, butt joint surfaces provided between said segmental portions and having spray coatings of hard metal applied thereto, surface portions on said wheel elements bearing on one another in the assembled condition of the wheel structure, and spray coatings of a harder metal than said light metal applied to said surface portions of said wheel rim.

HANS BUSS.